AUTOMATIC RECORD CHANGER WITH SINGLE RECORD PLAY FACILITIES

Filed May 21, 1963 8 Sheets-Sheet 1

INVENTOR
JAMES T. DENNIS
by
Mason, Kolehmainen, Rathburn and Wyss
ATTORNEYS

Oct. 29, 1968 J. T. DENNIS 3,408,081

AUTOMATIC RECORD CHANGER WITH SINGLE RECORD PLAY FACILITIES

Filed May 21, 1963 8 Sheets-Sheet 3

Oct. 29, 1968 J. T. DENNIS 3,408,081

AUTOMATIC RECORD CHANGER WITH SINGLE RECORD PLAY FACILITIES

Filed May 21, 1963 8 Sheets-Sheet 6

United States Patent Office 3,408,081

Patented Oct. 29, 1968

3,408,081
AUTOMATIC RECORD CHANGER WITH SINGLE RECORD PLAY FACILITIES

James T. Dennis, 812 American National Bldg., Oklahoma City, Okla. 73102

Filed May 21, 1963, Ser. No. 281,915
24 Claims. (Cl. 274—10)

The present invention relates to automatic phonograph apparatus, and, more particularly, to a new and improved automatic record changer for phonograph apparatus and improved single record play facilities therefor.

While automatic record changers are widely used today, the records played on these changers inherently become worn and damaged due to scratching and scuffing of the records on one another as they are placed on the record stack, automatically deposited on the turntable on top of one another and removed from the automatic record change. This wear is sufficient so that many automatic record changer users also provide themselves with a manual player on which certain choice records are played on a single record basis so as to avoid the wear and tear on these records normally accompanying automatic record changer use. This is particularly true in high fidelity systems wherein record wear becomes most noticeable. While certain automatic record changers heretofore proposed have provided facilities for playing a single record, these arrangements have not been altogether satisfactory. For example, certain of these prior art changers have proposed to provide separate centering spindles for automatic changer operation and for single record play operation. However, these separate spindles, and particularly the small spindle used for single record play operation, may become misplaced or lost so that the benefits of the dual functioning of the apparatus are lost. Furthermore, these prior art arrangements have generally required a separate indexing mechanism or individual buttons to select the desired record size for single record play so that the tone arm may be indexed properly for different sized records during single record operation.

It is, therefore, an object of the present invention to provide a new and improved automatic record changer having single record play facilities wherein one or more of the above mentioned disadvantages of the prior art arrangements is avoided.

It is another object of the present invention to provide a new and improved automatic record changer which may be simply converted to a single record player by moving the centering spindle used for automatic changer operation downwardly to such position that only the upper end of this spindle extends above the turntable so that a single record may be played in a manner similar to conventional single record turntables or players.

It is a further object of the present invention to provide a new and improved automatic record changer wherein facilities are provided for moving the centering spindle downwardly to act as a short centering element for a single record and automatic indexing of the tone arm to a 12-inch record position is provided through the same controls normally employed for automatic record changer operation.

It is a still further object of the present invention to provide a new and improved automatic record changer which employs a record supporting member positioned adjacent the edge of the turntable for supporting the edge of a stack of records positioned on the centering spindle and means are provided responsive to movement of this record supporting member to a fully retracted position for releasing the centering spindle so that it may be moved to a lower position in which only the upper tip of the spindle projects above the turntable for single record play operation.

It is another object of the present invention to provide a new and improved automatic record changer having a centering spindle provided with a record supporting shelf for supporting a stack of records above the turntable and means for mounting the spindle so that it may be retracted to a position in which the shelf portion thereof is positioned below the surface of the turntable for single record play operation.

It is a further object of the present invention to provide a new and improved automatic record changer having a centering spindle which includes a pivoted blade cooperating with a record supporting shelf on the spindle to release records onto the turntable during successive record changing cycles and facilities are provided for moving this spindle to a retracted position in which only the upper end of the spindle extends above the upper surface of the turntable while providing facilities which prevent jamming of the spindle actuating mechanism during single record play operation.

In many of the automatic record changers in use today a balance arm is employed to maintain the record stack horizontal during the record changing cycle as the bottommost record of the stack is pushed off of the record supporting shelf on the centering spindle. This balance arm must be lifted upwardly and moved outwardly beyond the edge of the record stack before records can be added to or removed from the centering spindle of the changer. Furthermore, when a balance arm is employed a separate tone arm indexing member is normally employed which is struck as the record is deposited on the turntable. When the record strikes this tone arm indexing member it is tilted somewhat so that the record does not fall horizontally on a cushion of air but instead falls quite sharply onto the turntable since the record is deflected from a horizontal position as it is dropped. While certain record changer arrangements have proposed the use of an edge support for the records, these arrangements have, in general provided the mechanism for releasing the bottommost record of the stack in the edge support mechanism and have usually required a clamp to hold the stack of records down against the pusher mechanism at the edge of the record stack. These arrangements have also generally required separate mechanisms for determining record size for tone arm indexing purposes and to provide an indication when the last record has been played for automatic shutoff purposes.

A further important object of the present invention is to provide an automatic record changer arrangement wherein one or more of the above mentioned disadvantages of record changers of the balance arm or edge support types is avoided.

It is a further object of the present invention to provide a new and improved automatic record changer wherein a stack of records is supported on a centering spindle and a separate record supporting member positioned at the edge of the record stack, the records being released from the stack by actuation of a pivoted blade within the centering spindle.

It is a still further object of the present invention to provide a new and improved automatic record changer wherein the record stack is partially supported at the edge thereof by means of a record supporting member which can be moved to a plurality of support positions corresponding to 7-inch, 10-inch and 12-inch records.

It is another object of the present invention to provide a new and improved automatic record changer wherein a stack of records is partially supported by a record supporting member positioned at the edge of the stack, which member has a plurality of positions corresponding to records of different diameters and facilities are provided for indexing the tone arm of the changer in response to movement of this record supporting member to the different record diameter positions.

It is still another object of the present invention to provide a new and improved automatic record changer wherein the record stack is partially supported at the edge thereof by means of a record supporting member and facilities are provided for moving this member inwardly toward the centering spindle to sense when the last record of the stack has been played.

It is a further object of the present invention to provide a new and improved automatic record changer wherein the record stack is partially supported at its edge by means of a record supporting member having a plurality of positions corresponding to 7-inch, 10-inch and 12-inch records and facilities are provided for moving this member inwardly toward the centering spindle in each of said positions to determine when the last record of the stack has been played.

It is a still further object of the present invention to provide a new and improved automatic record changer wherein a stack of standard centering aperture records is partially supported at the edge thereof by means of a record supporting member and facilities are provided for playing a stack of enlarged centering aperture records with a slip-on spindle while employing said record supporting member to determine when the last record of said last named stack of records has been played.

In my copending application Serial No. 168,305, filed January 16, 1962, now Patent No. 3,254,896, which application is a continuation of my earlier application Serial No. 752,969, filed August 4, 1958, now abandoned, there is disclosed an arrangement for stopping the turntable during at least a portion of the record changing cycle so as to prevent wear on the records as they are deposited on the turntable during successive record changing cycles. While this arrangement is entirely satisfactory for its intended purpose, certain situations may arise wherein it is desired to stop rotation of the turntable during the playing cycle. For example, if a long playing 12-inch record is being played and the listener has to leave the room for some purpose, such as to answer the phone, it would be desirable to provide facilities for stopping the turntable without lifting the tone arm off the record so that playing of the record can be resumed at some later time without losing the point at which the listener stopped and without replaying the entire record to this point.

It is, therefore, a further important object of the present invention to provide an automatic record changer wherein facilities are provided for stopping the turntable at any desired point during the playing cycle of the changer.

It is another object of the present invention to provide an automatic record changer which may be converted to a single record player while providing facilities for stopping the turntable during either the playing cycle of the machine when used as an automatic record changer or the playing cycle when used as a single record player.

It is still another object of the present invention to provide a new and improved automatic record changer wherein facilities are provided for stopping the turntable during the record changing cycle to prevent wear on the records as they are deposited onto the turntable during successive record changing cycles and means operable independently of said automatic turntable stopping means are provided for stopping the turntable at any desired point in the playing cycle.

It is a further object of the present invention to provide a new and improved automatic record changer wherein a driving turntable and a concentric record supporting turntable are provided and the record supporting turntable may be stopped in response to vertical movement of the driving turntable.

It is still another object of the present invention to provide a new and improved automatic record changer wherein a driving turntable and concentric record supporting turntable are provided and the record supporting turntable may be stopped by lowering the driving turntable to a point at which the record supporting turntable engages a stationary surface and the driving turntable is disconnected therefrom.

The invention, both as to its organization and method of operation, together with further objects and advantages thereof, will best be understood by reference to the following specification taken in connection with the accompanying drawings, in which.

Figure 1:
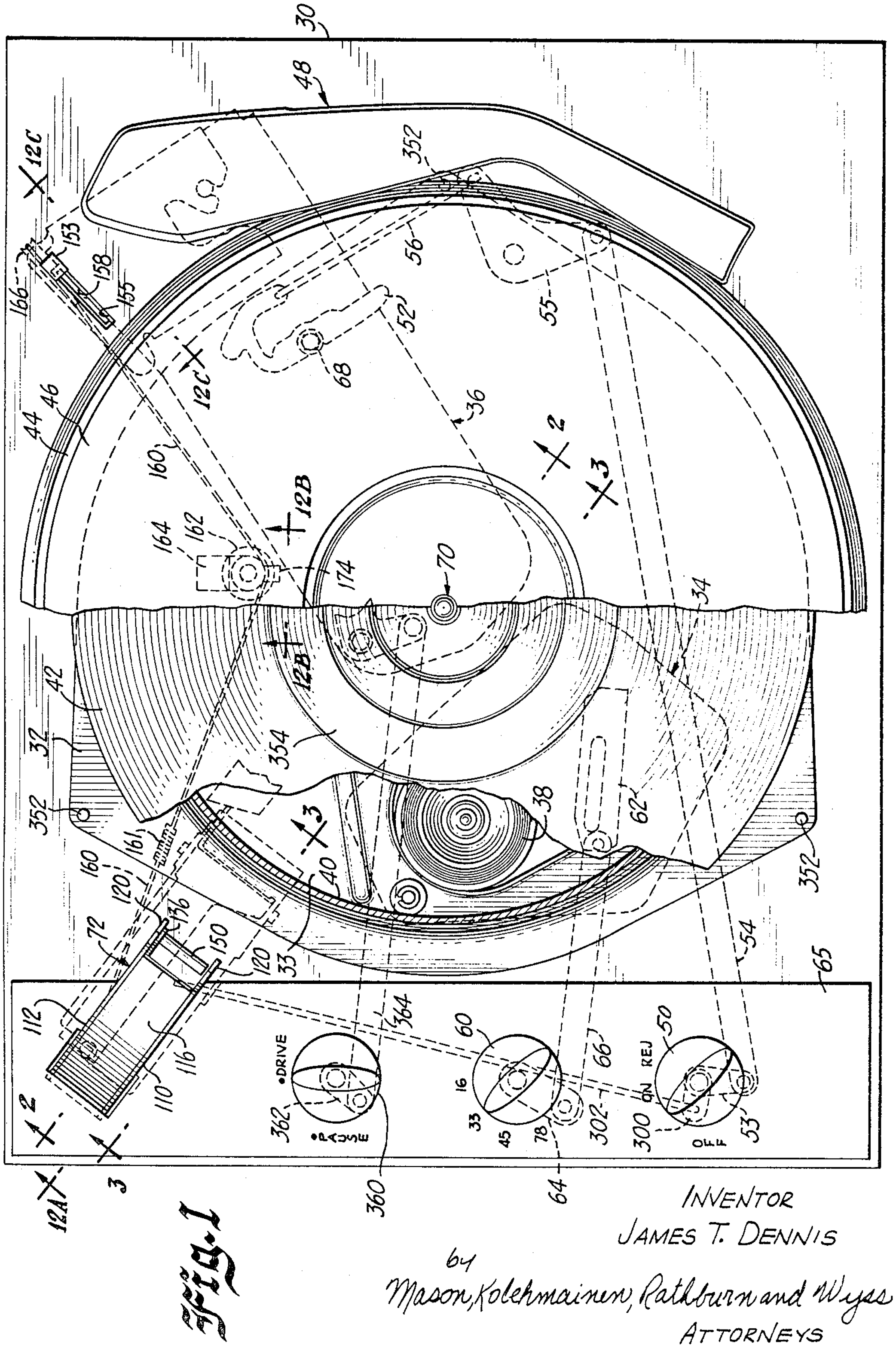
FIG. 1 is a plan view of an automatic record changer embodying features of the present invention.
Figure 3:
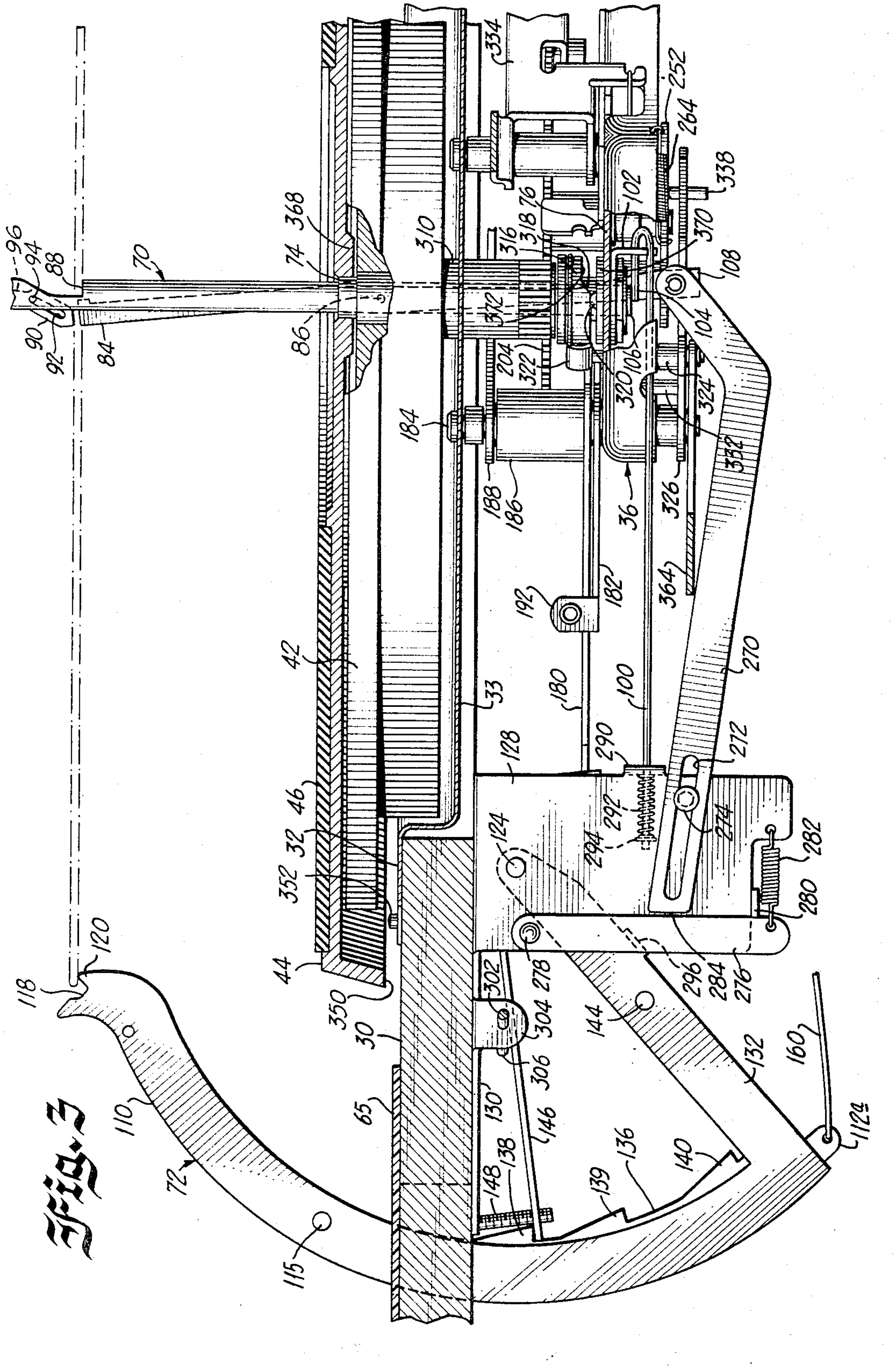
FIG. 3 is a fragmentary sectional side elevational view taken along lines 3—3 of FIG. 1.
Figures 4, 5, 11:
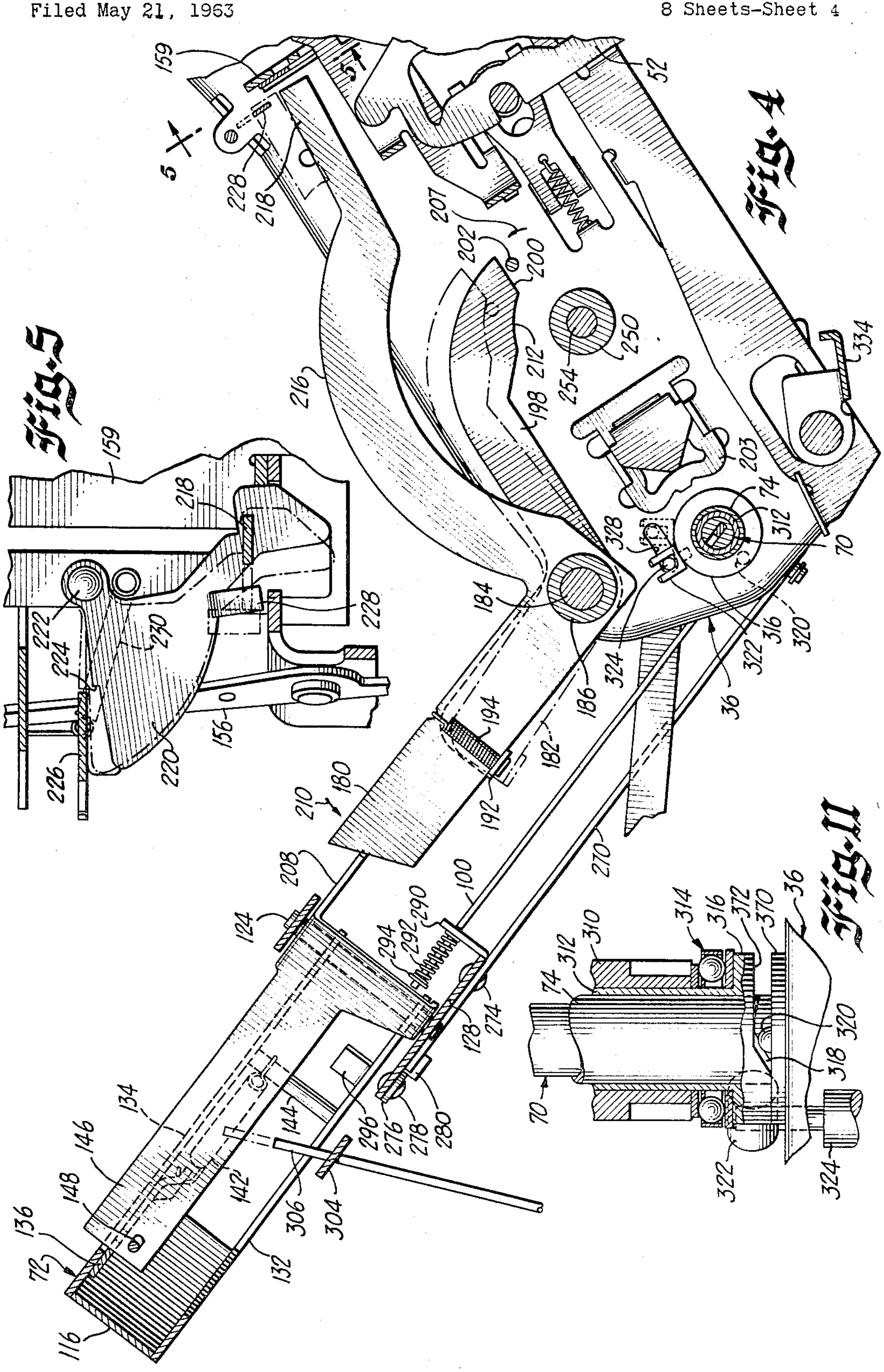
FIG. 4 is a fragmentary sectional plan view taken along lines 4—4 of FIG. 2.
FIG. 5 is a fragmentary sectional side view taken along lines 5—5 of FIG. 4.
FIG. 11 is a fragmentary side elevational view similar to a portion of FIG. 3 and showing the turntable support in lowered position.
Figures 11A, 12A, 12B, 12C:
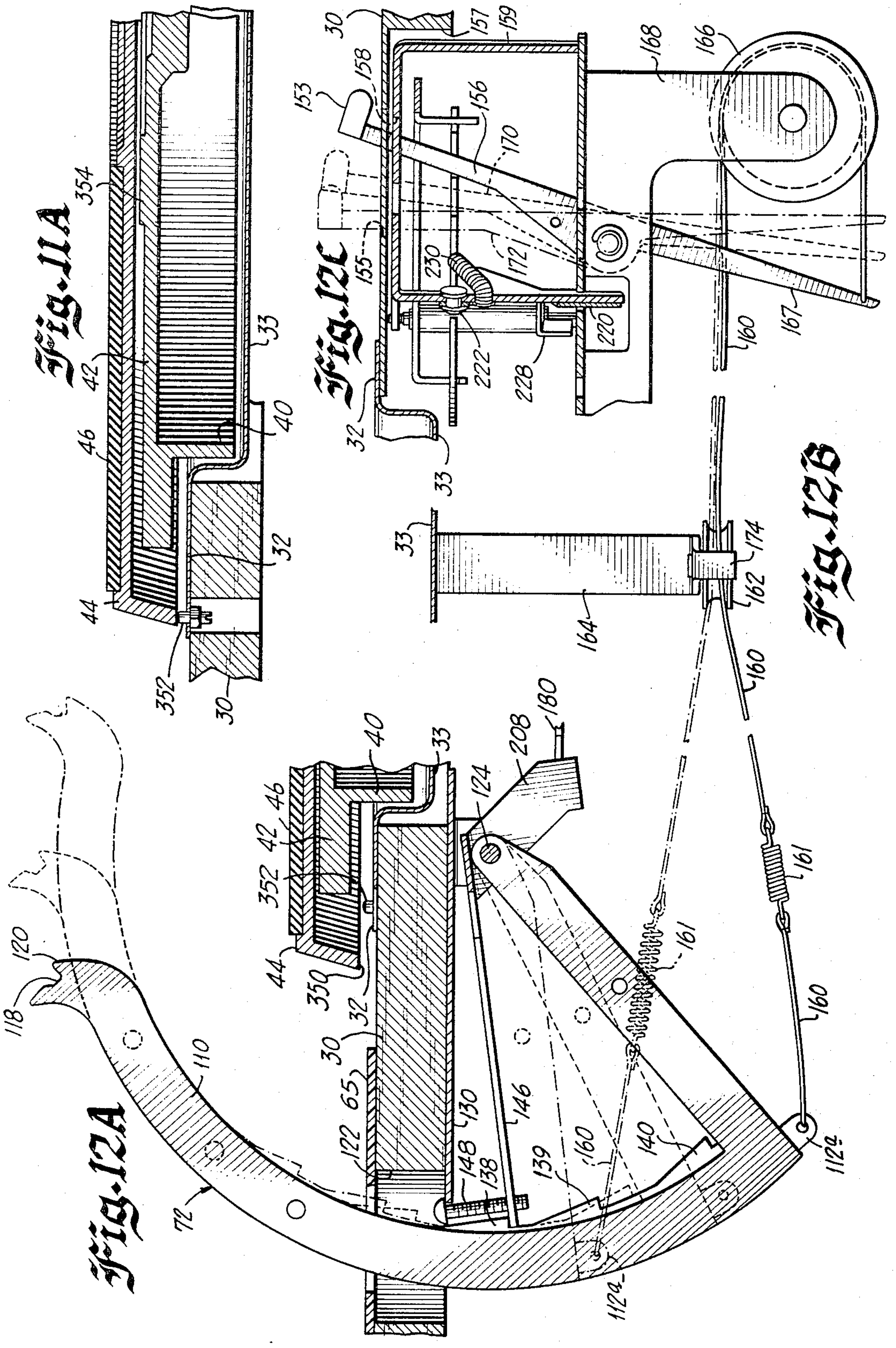

FIG. 11*a* is a fragmentary side elevational view of the turntable rim portion of FIG. 3 shown in the same position as FIG. 11; and FIGS. 12A, 12B and 12C are sectional side views taken along the lines 12A—12A, 12B—12B and 12C—12C, respectively, of FIG. 1 and showing the mechanism interconnecting the support assembly and tone arm indexing members in the arrangement of FIG. 1.

Referring now to the drawings, the automatic record changer of the present invention is therein illustrated as comprising a main mounting board 30 on which is mounted a metal base plate 32 having a depressed central portion 33 on which is mounted a motor subassembly indicated generally at 34 and a main base subassembly 36. The motor subassembly 34 includes an idler wheel 38 which is shown in the neutral position in FIG. 1 but which is moved into driving engagement with the rim 40 of a lower turntable 42 when the changer is turned on. An upper turntable indicated generally at 44, which is provided with a mat or cushion 46 for receiving records deposited on the turntable 44, normally rests on the lower turntable 42 and rotates therewith. A control knob 50 for the main base subassembly 36 is connected to a control lever 52 thereof by means of a linkage which includes the link members 53, 54, a pivoted bell crank 55 and a control rod 56. The control lever 52 is normally biased to the mid-position shown in FIG. 1 so that the knob 50 normally occupies the position shown in this figure. A speed control knob 60 is also provided which is connected to a speed control cam member, indicated generally at 62 on the subassembly 34, which has a plurality of stepped portions corresponding to different turntable speeds, by means of a linkage which includes the link 64 and the link 66. A nameplate 65, which carries suitable indicia for indicating the positions of the knobs 50 and 60 is secured to the mounting board 30.

The motor subassembly 34 and the main base subassembly 36 are substantially identical to the corresponding elements shown in my copending application Serial No. 265,421, filed March 15, 1963, except for certain features to be described in more detail hereinafter, and reference may be had to my copending application for a detailed description of the motor subassembly 34 and main base subassembly 36. However, for the purposes of the present invention, it may be stated that the main base subassembly 36 includes facilities for controlling movement of a tone arm assembly, indicated generally at 48, during the record changing cycle. The control lever 52 is normally biased to the mid-position shown in FIG. 1, in which position the automatic record changer is turned off and the idler wheel 38 is withdrawn from the rim 40 of the driving turntable 42. When the control knob 50 is rotated in a clockwise direction to the REJ. position the control lever 52 is pivoted in a clockwise direction about the post 68 so that the motor (not shown) on the assembly 34 is turned on, the idler wheel 38 is moved into engagement with the rim 40 and a record changing cycle is initiated. During this cycle a record is deposited on the mat 46 of the turntable 44 and the tone arm assembly 48 is positioned to engage the lead-in groove of this record. When this record has been played an automatic record changing cycle is initiated by a velocity tripping mechanism (not shown) during which cycle the tone arm 48 is withdrawn to a point beyond the edge of the largest record and is repositioned to engage the lead-in groove of the next record deposited on the turntable 44. If no more records are to be played a shutoff cycle is initiated in which the tone arm is positioned in a rest position beyond the edge of the largest record, the motor is turned off and the idler is moved to neutral. The speed of the turntable is selected by adjustment of the knob 60 which functions to move the speed control cam 62 so as to provide the desired driving speed for the idler wheel 38.

Considering now further features of the automatic record changer of FIG. 1 which are provided in accordance with the present invention, a centering spindle indicated generally at 70 is provided at the center of the turntables 42 and 44. The conventional balance arm, which is normally provided to hold a stack of records on the spindle 70 in a horizontal position as a record is released to the turntable, is, however, eliminated in the embodiment of FIG. 1 and a record edge support assembly, indicated generally at 72, is provided to support the edge of a stack of records positioned on the spindle 70.

Figure 6:
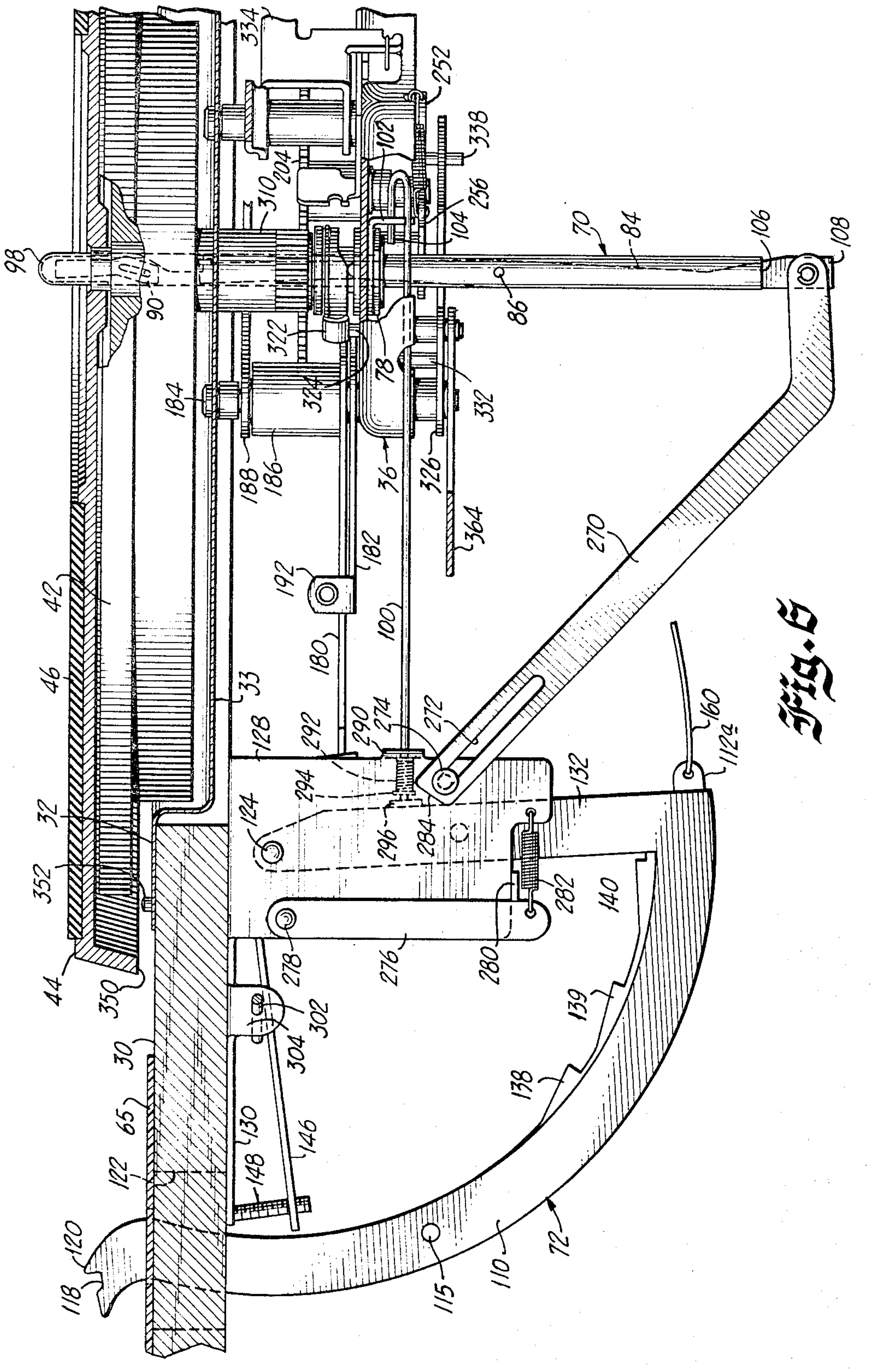
FIG. 6 is a side elevational view similar to FIG. 3 but showing the centering spindle and support mechanism in a fully retracted position.

In accordance with an important feature of the invention, the centering spindle 70 is arranged to be moved vertically from an upper position (FIG. 3) in which the spindle is adapted to support a stack of records above the turntable 44, to a lower position, illustrated in FIG. 6, in which only the upper tip portion of the spindle 70 extends above the upper surface of the turntable 44. More particularly, a vertically extending tubular sleeve 74 (FIG. 2) is secured to the main base member 76 of the main base subassembly 36 by means of a nut 78 and the spindle 70 is arranged for sliding vertical movement within the sleeve 74. The spindle 70 is provided with a transverse slot 80 which is adapted to receive a flat blade 82 which is pivotally mounted to the spindle 70 by means of the pin 86. The spindle 70 is also provided with an undercut portion defining a record supporting shelf 88 and an upper guide blade 90 is provided to guide a stack of records so that they are seated on the shelf 88 as they are placed on the spindle 70. When the spindle blade 84 is actuated by means to be described in more detail hereinafter, the blade 84 is pivoted about the pin 86 in a clockwise direction as viewed in FIG. 2 and the upper end of the blade 84 functions to push the bottommost record of the stack off of the shelf 88 so that this record is deposited on the turntable 44. The blade 84 is then returned to its initial position, at which time the next record is seated on the shelf 88 in position for the next record changing cycle. It will be noted that the centering spindle 70 is not provided with any offset upper portion as in many conventional centering spindles. Furthermore, both the blade 84 and the guide blade 90 are retractable within the circular cross section of the spindle 70. To this end the guide blade 90 is provided with a slot 92 which receives a transverse pin 94 and the upper end 96 of the guide blade 90 is arranged to move into the hollow upper tip portion 98 of the spindle 70. Accordingly, the spindle 70 may be moved downwardly within the tubular sleeve 74 to provide for single record operation, as will be described in more detail hereinafter. However, for automatic record changer operation, the spindle 70 is held in the uppermost position shown in FIG. 3. This is accomplished by means of a control rod 100 (FIG. 3) one end of which is slidably mounted in a bracket 102 secured to the base member 76 by the nut 78, and is provided with a reversely bent end portion 104 which is positioned beneath the bottom end portion 106 of the spindle 70, it being understood that the spindle blade 84 is provided with an offset end portion 108 at the bottom end thereof which extends substantially below the bottom end 106 of the spindle 70. The spindle 70 is thus held in its upper position shown in FIG. 3 by virtue of the fact that the bottom end 106 thereof rests on the end portion 104 of the control rod 100 so that the record supporting shelf 88 of the spindle 70 is positioned at a predetermined level above the turntable 44.

Considering now the record edge support assembly 72, this assembly is arranged to be moved from a fully retracted position shown in FIG. 6 to any one of three positions corresponding to 7 inch, 10 inch and 12 inch records, in which positions the assembly 72 is arranged to be positioned beneath the outer edge of a stack of records of the corresponding diameter which are positioned on the shelf 88 of the centering spindle 70. More particularly, the assembly 72 comprises a pair of curved side bar members 110 and 112 which are held in spaced apart relation by means of a plurality of transverse pins 114 and 115 and a curved top wall 116 which may be of plastic, or the like. The tip portions of each of the side bars 110 and 112 are provided with notches 118 so as to define record supporting ledges 120 on which the edge of the record stack rests. The assembly 72 extends through a suitable clearance opening 122 in the mounting board 30 and is arranged for pivotal movement about a pivot pin 124 which is secured between a pair of spaced depending portions 126 and 128 of a mounting bracket 130 which is secured to the under side of the mounting board 30. The side bars 110 and 112 are provided with right angle offset portions 132 and 134, respectively, which are pivotally mounted on the pin 124. The curved side bar portions 110 and 112 are formed as arcuate portions of a circle having as its center the pin 124 so that the assembly 72 may be bodily moved about the pivot pin 124 as a center. Preferably, the 7 inch, 10 inch and 12 inch record supporting positions of the assembly 72 lie along the upper arcuate portion of this circle so that in the 10 inch record supporting position of the assembly 72 the supporting ledges 120 will be positioned at a level slightly higher than the record supporting shelf 88 whereas in the 7 inch and 12 inch positions of the assembly 72 the ledges 120 will be positioned at or below the level of the shelf 88. With this arrangement the assembly 72 may be employed as a record edge support for stacks of records of widely different diameters while, at the same time, permitting the assembly 72 to be retracted to the fully retracted position shown in FIG. 6 in order to play a single record.

To position the assembly 72 at the desired 7 inch, 10 inch and 12 inch record supporting positions there is provided a curved latching lever 136 (FIG. 2) which is pivotally mounted on the transverse pin 115 between the curved side bars 110 and 112. The lever 136 is provided with a plurality of shoulders 138, 139 and 140, corresponding respectively to the 12 inch, 10 inch and 7 inch positions of the assembly 72, and the lever 136 is normally biased into engagement with the cross bar 114 by means of a spring 142 which is connected between the bottom end of the lever 136 and a cross bar 144 which is connected between the side bar portions 132 and 134. An adjustment plate 146, which is pivotally mounted for movement about the pin 124, is provided with an adjustment screw 148 in the outer end thereof, the head of the screw 148 resting on the outer edge of the bracket 130 which is secured to the mounting board 30.

Figure 2:
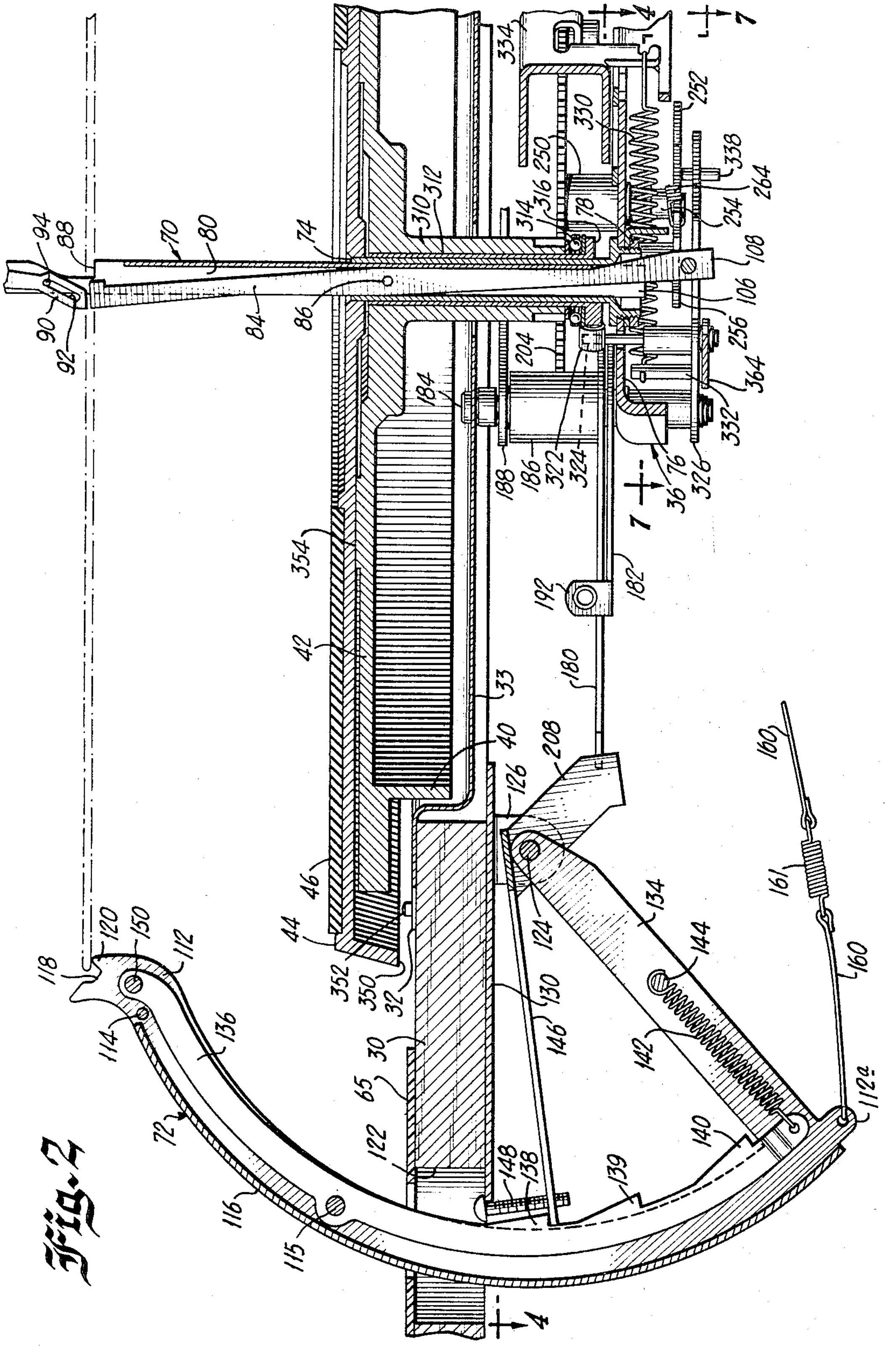
FIG. 2 is a fragmentary sectional side elevational view taken along the line 2—2 of FIG. 1.

One of the shoulders 138, 139 or 140 is arranged to rest on the end portion of the adjustment plate 146 so as to position the record supporting ledges 120 of the assembly 72 at the correct point for engagement with the edge of a record stack of the corresponding diameter. Thus, as shown in FIG. 2, when the shoulder 138 rests on the end of the adjustment plate 146 the supporting ledges 120 are positioned correctly for engagement with the outer edge portion of a stack of 12-inch records. If it is desired to reposition the assembly 72 for edge support of a stack of 10 inch records, the assembly 72 is pivotally moved about the pin 124. As this occurs the latching lever 136 is pivoted by engagement of the inclined portion of the shoulder 139 with the end of the adjustment plate 146 until the shoulder 139 has passed the end of the plate 146 at which point the shoulder 139 rests on the upper surface of the end of the plate 146 to position the ledges 120 correctly for 10-inch records. In a similar manner the assembly 72 may be pivoted forwardly an additional amount until the shoulder 140 is positioned on the upper edge of the plate 146. In each of the above described positions of the assembly 72, the weight of this assembly rests on the end of the adjustment plate 146 which in turn is supported by engagement of the head of the adjustment screw 148 with the end of the bracket 130. If it is desired to adjust the record supporting positions of the assembly 72, the screw 148 may be rotated so as to change the position of the adjustment plate 146 relative to the end of the bracket 130 and thereby vary the record supporting positions of the ledges 120.

In the event that it is desired to move the record edge support assembly 72 downwardly from the 7-inch support position, for example, to the 12-inch support position, the latching lever 136 may be manually released by exerting downward pressure on a transverse pin 150 secured to the upper end of the latching lever 136, so that the lever 137 is pivoted about the cross bar 115 by an amount sufficient to move one of the shoulders 138, 139 or 140 beyond the edge of the adjustment plate 146 against the force of the spring 142. This releases the assembly 72 so that it may fall back either to the next record support position or to its fully retracted position shown in FIG. 6.

In accordance with a further important feature of the present invention, the positioning of the record support assembly 72 to support record stacks of different diameters is employed to position the tone arm for engagement with the lead-in groove of a record of the corresponding diameter so that when a record is released from the shelf 88 as of the spindle 70 it will not be struck and tilted by engagement with a tone arm indexing member, as in the arrangement described in my above identified copending application. In the arrangement of the present invention the pivoted spindle blade 84 moves the bottommost record of the stack laterally so that it is moved off of the record supporting ledges 120 and the record supporting shelf 88 and the record is thereafter permitted to drop free horizontally so that it builds up a cushion of air and strikes the turntable mat 46 quite gently. In the illustrated embodiment of the present invention the main base subassembly 36 employs the same type of tone arm indexing mechanism described in my above identified copending application. Accordingly, the shank portion of the pivoted tone arm indexing member 156, which cooperates with the other portions of the tone arm indexing mechanism as described in detail in my above identified copending application, extends through a slot 158 formed in the bracket 159 of the subassembly 36 which is positioned within a recess 157 in the mounting board 30, and through a larger slot 155 in the board 30. When the member 156 occupies a position at the rear end of the slot 158 the tone arm indexing mechanism is positioned correctly for indexing the tone arm assembly 48 to engage a 12 inch record. However, since the tone arm indexing member is not to be engaged by a record as it falls to the turntable, the head portion of this indexing member, which is struck by a falling record in the arrangement disclosed in my copending application, is eliminated in the embodiment of the pesent invention. Also, the spring which was provided in my copending application to bias the member 156 toward the forward end of the slot 158 is eliminated in the embodiment of the present invention and the tone arm indexing member is weighted by the mass 153 so that it falls to the rear of the slot 158 and hence normally remains in the 12 inch indexing position. In this connection it will be understood that the mass 153 may be positioned below the top wall of the bracket 159 and additional clearance provided for the bracket 159 so that the slot 155 in board 30 can be eliminated and the tone arm indexing mechanism completely hidden since it is controlled only by the assembly 72 and parts on the main subassembly 36.

In order to position the tone arm indexing member 156 to the correct position for indexing 10-inch and 7-inch records, a flexible cord or wire 160 (FIGS. 12A, 12B and 12C) is connected at one end thereof to a tab 112*a* on the bottom end of the side bar 112, passes over a pulley 162, which is mounted on a bracket 164 depending from the base plate portion 33 so that the pulley 162 rotates about a vertical axis, then passes over a pulley 166 which is mounted for rotation about a horizontal axis on a depending side wall portion 168 of the base member 76, and is secured to an extension portion 167 of the tone arm indexing member 156 below the pivot point thereof. A small coil spring 161 is provided in series with the cord 160 between the tab 112*a* and the pulley 162.

When the record support assembly 72 is in the 12-inch record supporting position shown in full lines in FIG. 12A, the cord 160 is taut but does not produce any force on the tone arm indexing member 156 tending to move this member forwardly within the slot 158. However, when the assembly 72 is moved to the 10 inch record supporting position shown in dotted lines in FIG. 12A, the tab 112*a* to which the cord 160 is secured, moves away from the pulley 162 so that the tone arm indexing member moves forwardly within the slot 158 to the 10-inch indexing position indicated in dotted lines at 170 in FIG. 12C. However, the force required to move the member 156 to the position 170 is preferably not great enough to stretch the spring 161.

When the assembly 72 is moved to the 7-inch record position indicated in dot-dash lines in FIG. 12A, the cord 160 is moved further away from the pulley 162 so that the indexing member 156 is moved forwardly an additional amount to the 7-inch indexing position indicated in dot-dash lines at 172 in FIG. 12C in which position the member 156 engages the forward end of the slot 158. The spring 161 is then stretched somewhat since movement of the assembly 72 between the 10-inch and 7-inch positions is somewhat greater than the permissible movement of the member 156. When the support assembly 72 is moved to its fully retracted position shown in FIG. 6, the cord 160 becomes slack and exerts no force on the member 156 with the result that this member remains at the rear end of the slot 158 due to the weight 153, as described above. Preferably, a keeper 174 is provided over the side of the pulley 162 so that the cord 160 does not fall off of this pulley when it is slack during periods when the assembly 72 is in the fully retracted position.

In accordance with a further feature of the present invention, the support assembly 72 is also employed as a sensing mechanism to determine when the last record of the stack has been played and under these conditions to actuate the last record shut-off mechanism of the main base sub-assembly 36 so that the changer is disabled after the last record has been played by deenergizing the driving motor and removing the idler 38 from the turntable rim 40. To this end, a pair of control levels 180 and 182 (FIG. 4) are mounted for pivotal movement about one of the mounting posts 184 which is employed to secure the main base subassembly 36 to the depressed central portion 33 of the base plate 32. A sleeve 186 is positioned on the post 184 below the main cycling slide 188 of the main base subassembly 36 and the level 180 is secured to the bottom end of the sleeve 186. The bushing 186 is provided with a shoulder 190 (FIG. 3) on which the lever 182 is pivotally mounted so that the levers 180 and 182 may be moved independently of one another. However, the bottom lever 182 is provided with an upturned flange 192 and a spring 194 (FIG. 4) is connected between the upturned flange 192 and the opposite edge of the control lever 180 so that the levers 180 and 182 are normally urged together due to the force of the spring 194. The lever 182 is provided with an offset rearwardly extending portion 198 terminating in a transverse edge 200 which is normally positioned in the path of a pin 202 projecting downwardly from the underside of the main gear 204 (FIG. 9) of the main base subassembly 36.

In my above identified copending application the pin 202 is employed to move a spindle actuating crank which operates the spindle blade at substantially the midpoint of the record changing cycle. However, in the arrangement of the present invention the spindle blade 84 is actuated by a different mechanism to be described in more detail hereinafter and the spindle actuating crank 203 (FIG. 4) employed in my copending application may either be removed entirely or the tongue portion thereof which actuates the spindle blade may be removed as shown in FIG. 4. In the present invention, the pin 202 does initiate a sensing operation to determine whether any records remain supported on the record supporting shelf 88 of the spindle 70. The pin 202 is shown in the neutral or detent position of the main gear 204 in FIG. 4. However, as soon as a record changing cycle is initiated by any suitable means, such as the velocity tripping mechanism indicated generally at 205 in FIG. 9 and described in detail in my above identified copending application, the pin 202 moves in the direction of the arrow 207 (FIG. 4) and very shortly engages the end 200 of the control lever 182 and pivots this lever about the pivot post 184. Since the spring 194 functions to connect the levers 182 and 180, the above described movement of the lever 182 results in a pivotal movement of the lever 180.

The lever 180 is provided with an inclined edge 206 at the free end thereof which engages a downturned flange 208 provided in the adjustment plate 146. Accordingly, when the end of the lever 180 is moved in the direction of the arrow 210 (FIG. 4), a camming action is produced between the edge 206 and the flange 208 which functions to pivot the plate 146 upwardly about the pivot pin 124. Since the support assembly 72 rests on the end of the adjustment plate 146, this upward movement of the plate 146 results in an inward movement of the tip portion of the assembly 72 toward the spindle 70. If a record is positioned on the record supporting shell 88 of the spindle 70 and rests on the ledges 120 of the assembly 72, the above described inward movement of the assembly 72 is halted by engagement of the edge of the bottommost record with the notches 118 provided in the side bars 110 and 112. The notches 118 also prevent the record from lifting upwardly so that a positive stop is provided by the record. As can be seen from FIG. 3, this movement of the assembly 72 in response to a force exerted on the lever 180 results in only a short travel of the lever 180 until it is restrained from further movement by engagement of the edge of the record with the notches 118. The lever 180 is thus prevented from further movement. However. the control lever 182 continues to be moved by engagement of the pin 202 with the end 200 of the lever 182 and as the lever 182 continues to pivot about the post 184 the spring 194 stretches since the lever 180 is restrained in the manner described above by the presence of a record on the shelf 88. The lever 182 is thus moved to the dotted line position shown in FIG. 4 and continues to remain in this position while the pin 202 traverses a curved edge portion 212 of the lever 182.

As the pin 202 continues to move through the remainder of the record changing cycle, the lever 182 is again aligned with the lever 180 and both levers are returned to the position shown in full lines in FIG. 4, due to the weight of the assembly 72 on the plate 146 by the force of the spring 194. It will thus be seen that when a record is resting on the ledges 120 on the record supporting shelf 88 the lever 180 is prevented from moving a substantial amount. It will also be noted that above described action of a record in blocking inward movement of the assembly 72 functions in all three record supporting positions of the assembly 72. This will be clearly evident when it is realized that in all three record supporting positions of the assembly 72 this assembly rests on the adjustment plate 146 and would be moved inwardly in the same fashion to engage the edge of the record.

Considering now the operation of the levers 180 and 182 after the last record has been deposited on the turntable 44, it will be seen that when a record changing cycle is initiated after the last record has been played the pin 202 will again engage the end 200 of the lever 182 and will pivot this lever to the position shown in dotted lines in FIG. 4. The lever 180 is pivoted with the lever 182 and the camming action of the edge 206 on the flange 208 results in upward pivotal movement of the adjustment plate 146 and carries the assembly 72 inwardly by a substantial amount since the tip portion of this assembly is no longer blocked by the edge of a record positioned on the ledges 120 and the shelf 88. Accordingly, the lever 180 is, under these circumstances, permitted to pivot about the post 184 by a substantial amount. The lever 180 is provided with a curved offset portion 216 and terminates in a rearward extending portion 218 which is positioned adjacent the quadrant lever 220 (FIG. 5) of the tone arm indexing mechanism on the main base subassembly 36. As described in detail in my above identified copending application, the quadrant lever 220 is pivotally mounted on a pin 222 secured to one wall of the bracket 159, and sets up a last record shutoff cycle when the shoulder portion 224 of the quadrant lever 220 is moved upwardly beside the edge of the pawl stop 226. In the embodiment of the present invention the quadrant lever 220 is provided with an offset flange portion 228 which is positioned in the path of the end portion 218 of the control lever 180. Accordingly, when no record remains to be played and the control lever is pivoted about the post 184 by a substantial amount, the end portion 218 thereof engages the offset flange 228 of the quadrant lever 220 and pivots this quadrant lever about the post 222 so as to move the shoulder 224 thereof up to a position beside the edge of the pawl stop 226, as shown in dotted lines in FIG. 5. Since this action takes place at substantially the beginning of the record changing cycle, the pawl stop 226 is restrained by the shoulder 224 and functions to index the tone arm assembly 48 to the rest position. This results in completion of a last record shutoff cycle in the manner described in detail in my above identified copending application so that the turntable driving motor is deenergized and the idler wheel 38 is removed from the turntable rim 40.

While the control lever 180 returns to its normal position shown in full lines in FIG. 4 after approximately one-quarter of the record changing cycle, the quadrant lever is held in the position to which it is moved in the manner described above by engagement of the end 218 with the flange 228, since the pawl stop 226 engages the shoulder 224 due to the force of the spring 230 (FIG. 12C). It will also be noted that the above described action of the control lever 180 does not in any way interfere with the action of the quadrant lever 220 in setting up a last record shutoff cycle in response to movement of the control knob 50 to the OFF position, as described in detail in my above identified copending application. It will, of course, be understood that in the present embodiment no balance arm arrangement is provided and hence the quadrant lever 220 is actuated only in response to movement of the control knob 50 or movement of the control lever 180. It is also pointed out that the above described action of the lever 180 in setting up a last record shutoff cycle by producing pivotal movement of the quadrant lever 220 is effective in each of the three record supporting positions of the assembly 72. Thus, irrespective of which one of the shoulders 138, 139 and 140 is resting on the plate 146, if no record is resting on the shelf 88, a substantial movement of the assembly 72 is permitted through the camming action of the lever edge 206 on the plate 146 with the result that the lever 180 is permitted to move a substantial amount and pivot the quadrant lever 220 to the above described shutoff position. It will also be understood that when the assembly 72 is thus moved by a substantial amount the spring 161, which is lighter than the spring 194, will stretch, in the event the indexing member 156 is moved to the forward edge of the slot 158 so as to permit this substantial movement of the assembly 72 for last record shutoff purposes. Obviously, if no records remain to be played the position of the indexing member 156 is not important and if records remain on the shelf 88 the indexing member 156 is not moved out of position.

In accordance with a further feature of the invention, the support assembly 72 is so arranged that when this assembly is positioned in a 7-inch record supporting position it does not interfere with the operation of a conventional slip-on spindle which may be used for large hole 7-inch records, while, at the same time, providing the above described sensing arrangement for determining when the last one of these large hole 7-inch records has been played and thereafter setting up a last record shutoff cycle. More particularly, when large hole 45 r.p.m. 7-inch records are to be played, a conventional slip-on spindle, indicated generally at 240 (FIG. 10), may be placed over the centering spindle 70 in such manner that the record supporting shoulders 242 of the slip-on spindle 240 are actuated in response to movement of the pivoted blade 84 of the spindle 70 so as to release the bottom record of the stack supported on the slip-on spindle 240. In this connection it will be understood that while the slip-on spindle 240 is of conventional construction, it must necessarily function with a centering spindle 70 of the type described above which is provided with a straight upper portion so that it can be depressed within the sleeve 74. However, slip-on spindles suitable for cooperation with a spindle of the same type as the spindle 70 are readily available and hence need not be described in detail in connection with the present invention.

Figure 10:
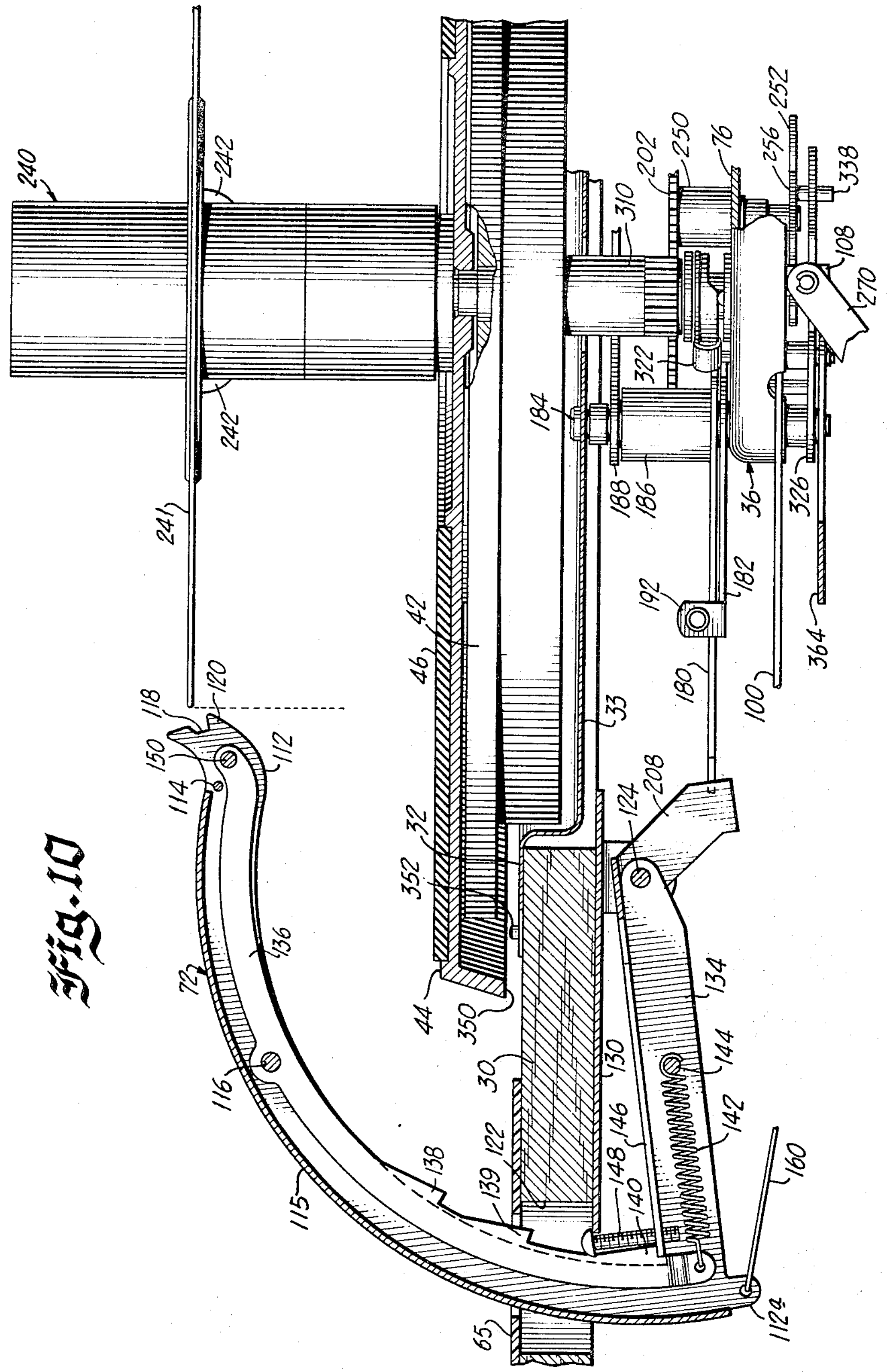
FIG. 10 is a fragmentary sectional side elevational view taken along the lines 10—10 of FIG. 1 and showing the record support assembly in the 7-inch record supporting position.

The 7-inch record supporting position of the assembly 72 is illustrated in FIG. 10 and it will be seen by reference to this figure that the record supporting ledges 120 of the assembly 72 are positioned outside of the path of a large hole 7-inch record 141 when it is released by the slip-on spindle 240. However, this same 7-inch record supporting position of the assembly 72 is satisfactory to support a stack of 7-inch records having standard centering apertures on the centering spindle 70 and the edge of this stack of records will engage the record supporting ledges 120. This is because of the fact that when a stack of standard centering aperture records are positioned on the record supporting shelf 88 of the spindle 70 the bottommost records of the stack are offset from the axis of the turntable 44 by the blade 84 by an amount sufficient to position the edge thereof on the ledges 120. However, when the slip-on spindle 240 is used the record stack is positioned concentric with the axis of the turntable 44 so that the bottommost record of the stack clears the ledges 120. It will thus be seen that the assembly 72, while functioning to support standard centering aperture 7-inch records in the 7-inch record supporting position, does not interfere with the action of the slip-on spindle 240 in releasing large hole 7-inch records to the turntable 44.

While the assembly 72 is positioned outside the path of large hole 7-inch records which are released by the slip-on spindle 240, the bottommost record of the stack positioned on the slip-on spindle 240 does function to block inward movement of the assembly 72 at the start of each record changing cycle in the same manner described previously in connection with the operation of the levers 180 and 182 in setting up a last record shutoff cycle. Thus, while the ledges 120 of the assembly 72 are positioned outside the path of large hole records released by the slip-on spindle 240, it will be evident from FIG. 10 that when the assembly 72 is moved inwardly the edge of a large hole record engages the notch 118 and prevents further inward movement of the assembly 72 so that the control lever 180 is blocked and cannot pivot the quadrant lever 220 with the result that no last record shutoff cycle is set up. However, when the last large hole 7-inch record 141 is released from the slip-on spindle 240, the assembly 72 is no longer prevented from substantial inward movement and the quadrant lever 220 is pivoted in the manner described in detail heretofore to set up the desired last record shutoff cycle.

Considering now the manner in which the spindle blade 84 of the centering spindle 70 is actuated during an automatic record changing cycle, the main cycling gear 204 is rotatably mounted in a bearing 250 (FIG. 9) mounted on the base member 76 and is arranged to be bodily elevated in rotation to provide an automatic shutoff action, as described in detail in my above identified copending application. As described heretofore, in the arrangement of the present invention the pin 202, which projects downwardly from the underside of the main gear 204, is not employed to actuate the spindle blade 84. In the present arrangement, a cam plate 252 is secured to the bottom end of a shaft 254 the upper end of which is connected to the main gear 204 so that the cam plate 252 rotates with the main gear 204 and may be elevated therewith during an automatic shutoff cycle. A cam follower member 256 is secured to a sleeve 257 pivotally mounted on a stud 258 secured to the base member 76 and the member 256 is provided with an arm portion 260 adjacent the edge of the cam plate 252. The other arm portion 262 of the follower 256 is positioned to engage the bottom end portion 108 of the spindle blade 84 when the spindle 70 is locked in its uppermost position shown in FIG. 2. The member 256 is provided with slot 261 within which is positioned a stop pin 263 secured to the base member 76. A spring 264 is connected between the arm 262 and the side of the base member 76 so as to urge the pin 263 against one end of the slot 261 and position the arm 260 adjacent the edge of the cam plate 252.

When the main cycling gear 204 is rotated one revolution during the record changing cycle, the cam plate 252 is rotated therewith and when the projecting cam surface 266 on the cam plate 252 engages the cam follower arm 260 the cam follower 256 is pivoted about the post 258 so that the arm 262 thereof engages the bottom portion 108 of the spindle blade 84 and pivots this blade about the pin 86 so as to move the bottommost record of the stack into alignment with the body portion of the spindle 70 and release the same to the turntable 44. After the cam portion 266 passes the follower arm 260, the member 256 is returned to its initial position by the spring 264. When the control knob 50 is actuated to the OFF position a shutoff cycle is initiated in the manner described in detail in my above identified copending application during which cycle the main gear 204 is bodily elevated to prevent another record from being dropped during this shutoff cycle. In the present arrangement, elevation of the main gear 204 during a shutoff cycle raises the cam plate 252 upwardly so that the cam portion 266 thereof does not engage the arm portion 260 and hence the spindle blade 84 is not actuated and no record is dropped. However, when the gear 204 is returned to its normal level the plate 252 is again positioned in the same plane as the cam follower 256 so that the spindle blade 84 may be actuated during succeeding record changing cycles when the changer is again turned on.

In order to position the spindle blade 84 in the manner shown in FIG. 3 so that this blade holds the bottommost record on the record shelf 88 during the playing cycle, while at the same time providing an arrangement whereby the spindle 70 may be released and moved downwardly to the single record playing position shown in FIG. 6, a control lever 270 is pivotally connected to the bottom end 108 of the spindle blade 84 through a transverse member 271 and the other end of the lever 270 is provided with an elongated slot 272 positioned beneath the head of a rivet 274 mounted on the side wall portion 128 of the mounting bracket 130. A biasing lever 276 is pivotally mounted on the side wall 128 by means of the pin 278 and is biased against a stop member 280 formed in the side wall 128 by means of a spring 282 which is connected between the bottom end of the lever 276 and the side wall 128. As shown in FIG. 3, a slight clearance is preferably provided between the end 284 of the control lever 270 and the adjacent edge of the biasing lever 276. However, when the spindle blade 84 is actuated in the manner described above by the cam follower 256, the control lever 270 is moved to the left, as viewed in FIG. 3, so that the end 284 thereof engages the edge of the biasing lever 276 and the lever 276 is moved away from the stop 280 against the force of the spring 282 as the blade 84 is actuated. The spring 282 thus serves the function of returning the spindle blade 84 to approximately the desired rest position of the spindle blade 84. The slight clearance provided between the end 284 of the lever 270 and the adjacent edge of the biasing lever 276, and the slight clearance provided between the arm 262 of the cam follower 256 and the adjacent end portion 108 of the spindle blade 84 permit the centering spindle 70 to drop downwardly within the sleeve 74 when the end portion 104 of the control rod 100 is moved away from the end portion 106 of the spindle 70.

In accordance with an important feature of the invention, an arrangement is provided for automatically releasing the centering spindle 70 so as to permit this spindle to be moved downwardly within the sleeve 74 to a single record play position in which only the upper portion 98 of the spindle 70 extends above the upper surface of the turntable 44. More particularly, the control rod 100 is slidably mounted in a tab portion 290 formed in the side wall 128 of the bracket 130 and a spring 292 is positioned between the flange 290 and a keeper 294 positioned on the end of the rod 100 so that the rod 100 is normally biased to the left, as viewed in FIG. 3, with the end portion 104 thereof beneath the spindle 70. When the support assembly 72 is manually released by actuation of the lever 136 so that it can be dropped to the fully retracted position shown in FIG. 6 the side bar 132 of the assembly 72, which is provided with a flange 296, is positioned to engage the end of the control rod 100 and move this rod to the right, as viewed in FIG. 3, to the position shown in FIG. 6. In this position, the spring 292 is compressed and the end portion 104 of the rod 100 is moved clear of the path of the spindle 70 so that this spindle is permitted to drop downwardly within the sleeve 74. As the spindle is moved downwardly within the sleeve 74, the spindle blade 84 and the slotted guide blade 90 are both retracted within the body of the spindle 70 by camming action with the upper edge of the sleeve 74 so that the spindle 70 is permitted to move to the fully retracted position shown in FIG. 6. Downward movement of the spindle 70 is restricted by engagement of the end of the slot 272 in the control lever 270 with the rivet 274, as shown in FIG. 6. In this connection it is noted that while the spindle 70 is described as dropping to the lower position shown in FIG. 6, alternative arrangement may be employed in which the centering spindle must be pushed to its lower position insofar as the present invention is concerned. Also, any suitable spindle construction may be employed which permits retraction of the spindle within the sleeve 74 to the described lower position for playing single records. For example an umbrella type spindle such as described in my Patent Number 2,939,714 issued June 7, 1960, may be used instead of the spindle 70 and a balance arm as shown in my copending application could be used in place of the assembly 72. An umbrella spindle of the type that completely supports and releases individual records of a stack onto the turntable could also be used instead of the spindle 70. A spindle that is used to support records above the turntable with the record releasing mechanism operating at the outer edge of the record could also be employed if it were a straight design such as spindle 70 so it could retract within the sleeve 74 to the lower position for playing single records.

When the spindle 70 is in its lower position shown in FIG. 6 the upper portion 98 of this spindle acts as a conventional short stub centering spindle for playing a single record on the turntable 44. However, it will be evident that the spindle blade 84 of the spindle 70 should not be actuated during single record operation, even though the automatic record changing mechanism is employed to position the tone arm on the record at the start of the single record playing operation and to reposition the tone arm on the rest post after the single record has been played. In accordance with a further feature of the invention, actuation of the spindle 70 is prevented while permitting the cam follower 256 to move through its normal path as in a conventional record changing cycle by providing the offset end portion 108 on the spindle blade 84. Thus, the cam follower 256 may move through its normal path by engagement with the cam portion 266 on the cam plate 252 without striking the side of the centering spindle 70 when this spindle is in the lower position shown in FIG. 6. However, the cam follower 256 is returned to its initial position shown in FIG. 7 at the end of each record changing cycle so that the spindle 70 may be raised to a position in which the offset end portion 108 of the blade 84 is again positioned adjacent the arm 262 of the cam follower 256 and the spindle blade 84 will thereafter be actuated in the normal manner by engagement with the arm 262 during the next record changing cycle.

During single record play operation, the record support assembly 72 is positioned in the fully retracted position shown in FIG. 6 and in this position of the assembly 72 the cord 160 is loose so that the tone arm indexing member 156 is positioned at the rear of the slot 158 and indexes the tone arm 48 for engagement with a 12 inch record which may be positioned manually on the upper end 98 of the spindle 70 as in a conventional manual player. However when a 12 inch record is placed on the turntable 44 and it is desired to initiate an automatic record changing cycle to automatically position the tone arm for engagement with the lead-in groove of this record, it is necessary to provide facilities for blocking the upward movement of the adjustment plate 146 at the start of this record changing cycle. This is because the support assembly 72, when in the fully retracted position shown in FIG. 6, is not resting on the plate 146 and this plate is free to move upwardly at the start of the record changing cycle in the same manner as is permitted when the assembly 72 is in the 7 inch, 10 inch or 12 inch record supporting position and no record is positioned on the shelf 88 during automatic record changing operation, as described heretofore. Since the plate 146 is free to move upwardly at the start of a record changing cycle, the control lever 180 will also be free to pivot about the post 184 and cause pivotal movement of the quadrant lever 220 so that a last record shutoff cycle will be initiated and the tone arm will remain in the rest position rather than be moved into engagement with a record on the turntable 44. To prevent such a last record shutoff cycle from being set up, a control linkage is provided which includes a lever 300, connected to the control knob 50, and a control rod 302 one end of which is connected to the lever 300 and the other end of which is slidably supported by a depending flange 304 provided on the bracket 130. As best illustrated in FIG. 4, the end portion 306 of the rod 302 is normally positioned outside the path of movement of the adjustment plate 146 so that upward pivotal movement of this plate about the pin 124 is normally not prevented by the control rod 302. Accordingly, the assembly 72 may be used to determined when the last record has been played by upward pivotal movement of the adjustment plate 146, in the manner described in detail heretofore. However, when a record is manually placed on the turntable 44 the control knob 50 is turned to the REJ. position to initiate a record changing cycle and this pivotal movement of the control knob 50 causes the control rod 302 to move forwardly to the position shown in dotted lines in FIG. 4, in which position the tip 306 thereof is positioned immediately above the adjustment plate 146 and prevents this plate from moving upwardly when the pin 202 pivots the lever 182 and exerts a force on the camming control lever 180, as described in detail heretofore. Accordingly, the adjustment plate 146 is blocked and the lever 180 is prevented from actuating the quadrant lever 220 when a record changing cycle is initiated to position the tone arm for engagement with a record to be played manually on the turntable 44. In this connection it will be understood that the control knob 50 is held in the REJ. position until the pin 202 has moved out of engagement with the lever 182. However, as will be seen from FIG. 4, this engagement lasts only during approximately the first one-quarter of the record changing cycle and the control knob 50 may thereafter be released so as to withdraw the control rod 302 from above the cam plate 146 without causing a last record shutoff cycle to be set up. When the record on the turntable 44 has been completely played, an automatic record changing cycle is initiated by the velocity tripping mechanism 205. However, at the start of this record changing cycle the control rod 302 is no longer positioned above the adjustment plate 146 so that this plate is free and the lever 180 is permitted to move by a substantial amount and lift the quadrant lever 220 at the start of the record changing cycle so that a last record shutoff cycle is set up in the manner described in detail heretofore. Accordingly, the tone arm is lifted off of the record and returned to the rest position and the machine is turned off after the single record has been played.

From the foregoing, it will be seen that the automatic record changer of the present invention may be readily adapted to play a single record by simply unlatching the support assembly 72 and moving this assembly to the fully retracted position shown in FIG. 6. This operation releases the centering spindle 70 which moves downwardly within the sleeve 74 to the single record play position shown in FIG. 6 and a single record may then be placed on the turntable 44. When the control knob 50 is actuated to the REJ. position the tone arm assembly 48 is automatically moved into engagement with the lead-in groove of the 12 inch record. The record is then played and at the end of the playing cycle a last record shutoff cycle is initiated in which the tone arm 48 is returned to its rest post position and the machine is turned off. If it is desired to play 10-inch records rather than 12-inch records, the support assembly 72 is merely lifted to its 10-inch record supporting position which functions automatically to position the tone arm for engagement with the lead-in groove of the 10 inch record, as described in detail heretofore. When the control knob 50 is actuated to the REJ. position to initiate playing of this 10 inch record, the control rod 302 will again be positioned above the adjustment plate 146 and prevent a last record shutoff cycle from being set up. However, after the knob 50 is released and the 10-inch record has been played a last record shutoff cycle will be initiated in the manner described above and the tone arm positioned in the rest position as before. The assembly 72 may likewise be positioned to the 7-inch record supporting position in the event a single 7-inch record is to be played.

In the event that it is desired to play a single record positioned on the turntable 44 repeatedly without causing the machine to shut off after this record has been played once, the control rod 302 may be actuated by a separate control knob (not shown) which may be moved into and held in a "repeat" position in which position the end of the control rod 302 will be continuously positioned over the adjustment plate 146, thereby preventing a last record shutoff cycle from ever being initiated. Under these conditions, the single record on the turntable 44 would continue to be played until either this separate control knob is moved from its repeat position to withdraw the control rod 302 from above the plate 146 or, in the alternative, the control knob 50 can be moved to the off position, in which case the control lever 52 is pivoted to set up a last record shutoff cycle in a manner identical to that described in detail in my above identified copending application.

When it is desired to restore the changer of the present invention to automatic record changing operation, the support assembly 72 is merely lifted upwardly to one of its record supporting positions corresponding to the diameter of the records to be played. This upward movement of the assembly 52 releases the control rod 100 so that the end portion 104 thereof bears against the side of the centering spindle 70. The spindle 70 may then be raised by grasping the upper end 98 thereof and lifting the spindle upwardly until the end portion 104 of the control rod 100 moves beneath the end portion 106 of the spindle 70 due to the biasing force of the spring 292. When this occurs the spindle 100 is locked in the correct upper position for supporting a stack of records on the shelf 88 in correct relation to the record supporting position of the support assembly 72. When the spindle 70 is thus lifted upwardly the offset end portion 108 of the blade 84 is moved into the correct position to be actuated by the cam follower 256 during record changing cycles so that normal record changing operation is restored.

In accordance with a further important feature of the present invention, an arrangement is provided whereby the rotation of the turntable 44 may be stopped at any time during a playing cycle when the tone arm assembly 48 is in engagement with a record on the turntable 44. Furthermore, facilities are provided for automatically stopping the turntable 44 during a portion of each record changing cycle so that this turntable is stationary when a record is deposited thereon by actuation of the spindle blade 84 in the manner described heretofore. More particularly, the hub 310 (FIG. 2) of the drive turntable 42 is rotatably mounted on a bearing sleeve 312. The end of the hub portion 310 rides on a ball bearing assembly indicated generally at 314, which assembly is positioned on a bottom flange portion 316 of the bearing sleeve 312. The bearing sleeve 312 is slidably and rotatably mounted on the sleeve 74 and the flange portion 316 thereof is provided with a cam shoulder portion 318 (FIG. 3) which rides on a single ball 320 mounted in the base portion of the sleeve 74 so as to raise or lower the sleeve 312 when it is rotated with respect to the sleeve 74. The bottom flange portion 316 of the bearing sleeve 312 is provided with a sidewardly extending yoke portion 322 (FIG. 4) the arms of which straddle a pin 324 which is mounted on a plate 326 (FIG. 3) and extends upwardly through a clearance slot 328 in the base member 76. The plate 326 is pivotally mounted on the bottom end of the support post 184 and the shutoff spring 330 of the main base subassembly 36 is connected between an upstanding post 332 on the plate 326 and the shutoff lever 334 of the main base subassembly 36. Since the weight of the turntables 42 and 44 rests on the bearing sleeve flange 316 the spring 330 does not function to bias the plate 326 to the position shown in FIG. 7. However, this spring does assist movement of the plate 326 from the position shown in FIG. 8 to position shown in FIG. 6, as will be described in more detail hereinafter. Also, the shutoff spring 330 performs all of the functions described in detail in my copending application in connection with the shutoff lever 334 while providing the above described bias for the plate 326 of the present invention.

The plate 326 includes a cam surface 336 which is adapted to be engaged by a depending pin 338 carried by the cam plate 252 when the plate 252 is rotated during the record changing cycle. Thus, during approximately the first half of the record changing cycle, the pin 338 engages the cam surface 336 and pivots the plate 326 to the position shown in FIG. 8. The pin 338 holds the plate 326 in this position as it rides along the curved cam surface 340 of the plate 326 until it engages the edge portion 342 of an offset arm portion 344 of the plate 326. Engagement of the pin 338 with the edge 342 then functions to pivot the plate 326 back to its original position shown in FIG. 7 during the last half of the record changing cycle.

Figures 7, 8, 9:
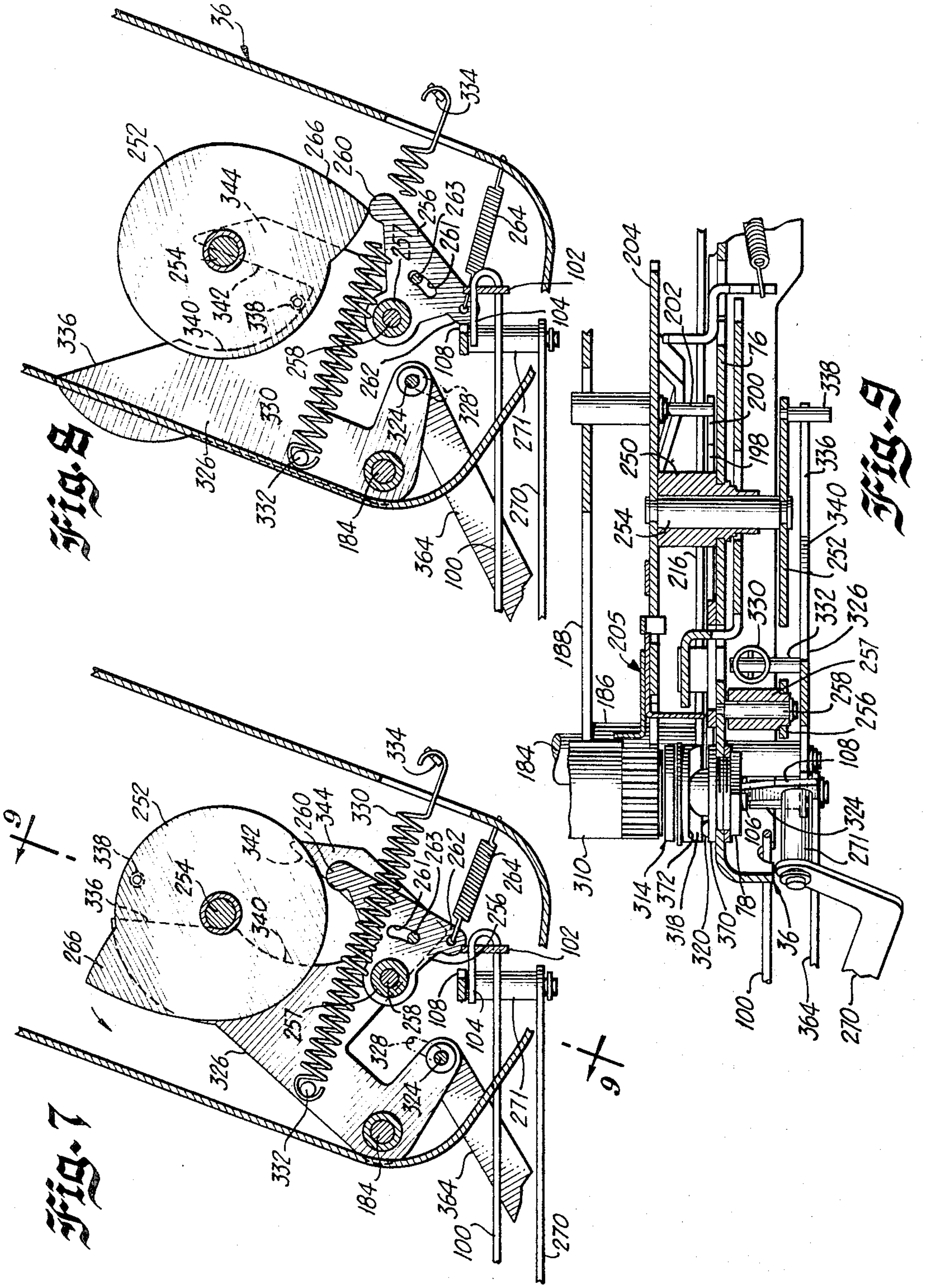
FIG. 7 is a fragmentary sectional plan view taken along the lines 7—7 of FIG. 2.
FIG. 8 is a plan view similar to FIG. 7 but showing the parts in a different position.
FIG. 9 is a sectional side elevational view taken along the lines 9—9 of FIG. 7.

When the plate 326 is pivoted to the position shown in FIG. 8, engagement of the pin 324 thereof with the yoke 322 functions to turn the bearing sleeve 312 so that the bearing sleeve 312 and the turntable 42 which is supported thereby is lowered on the sleeve 74 as the cam surface 316 rides down the ball bearing 320. The upper turntable 44 is lowered with the driving turntable 42 until the bottom edge 350 of the rim of this turntable engages a plurality of small snubbing blocks 352 which are secured to the base plate 32 and are spaced at three points around the periphery of the rim 350 of the turntable 44. The snubbing blocks 352, which may be of nylon or any other suitable material for engaging the metal rim of the turntable 44, act as a stationary surface which exerts a braking action on the upper turntable 44 and brings this turntable to a stop while, at the same time, the driving turntable 42 is lowered a slight additional amount to the position shown in FIG. 11A in which position the surface 354 of the driving turntable 42, on which the upper turntable 44 normally rests, is disengaged from the turntable 44 so that the driving turntable 42 continues to rotate while the upper turntable 44 is stopped. During the last half of the record changing cycle the pin 338 engages the edge portion 342 of the plate 326 and pivots this plate back to the position shown in FIG. 7. The cam surface 318 rides up the ball bearing 320 so as to raise the bearing sleeve 312 and the driving turntable 42 rotatably mounted thereon so that the surface 354 of the driving turntable engages the underside of the upper turntable 44 and lifts this turntable off of the snubbing block 352 so that the turntable 44 is thereafter rotated with the driving turntable 42. During this latter action of lifting the driving turntable 42, the shutoff spring 330 provides a force which tends to assist rotational movement of the bearing sleeve 312 with the consequent lifting of the turntable 42 so that the load placed on the driving mechanism of the main base subassembly 36 is not excessive. It will thus be seen that the upper turntable 44 is brought to a halt after approximately one-fourth of the record changing cycle and this turntable remains stationary as the cam portion 266 on the cam plate 252 engages the cam follower arm 260 and functions to actuate the spindle blade 84 in the manner described in detail heretofore so as to deposit a record on the turntable 44. Shortly after the record has been deposited on the turntable 44 the pin 338 engages the edge 342 and functions to pivot the plate 326 back to its original position shown in FIG. 7 so that the driving turntable 42 is lifted into engagement with the turntable 44 and thus lifts this turntable off of the snubbing blocks 352 and start it rotating.

The above described actuation of the plate 326, which is effective to stop the turntable 44, takes place during each automatic record changing cycle so that the turntable 44 is stationary when a record is deposited thereon by the centering spindle 70. In accordance with a further feature of the present invention, there is provided a manually controllable arrangement for stopping the turntable 44 at any time during the playing cycle and independently of the above described actuation of the plate 326 during the record changing cycle. More particularly, a control knob 360 is rotatably mounted on the mounting board 30 and is connected by means of a linkage which includes a short lever 362, connected to the knob 360, and a lever 364 which is pivotally connected between the lever 362 and the plate 326 at the bottom end of the pin 324. The control knob 360 may be actuated to either of two positions identified as the "drive" and "pause" positions of this knob. In the drive position of this knob shown in FIG. 1, the plate 326 is in the position shown in FIG. 7 in which position the driving turntable 42 is connected to the upper turntable 44 so that both of these turntables are rotating. In the event that it is desired to stop the turntable 44 for any reason during a playing cycle, the knob 360 may be moved to the pause position and the linkage 362, 364 functions to pivot the plate 326 about the post 184 to the position shown in FIG. 8, it being understood that under these conditions the cam plate 252 remains in the position shown in FIG. 7, since no record changing cycle has been initiated. When the plate 326 is thus pivoted, the turntable 42 is lowered so that the upper turntable 44 is stopped by engagement of the bottom surface 350 with the snubbing blocks 352 so that the turntable 44 remains stationary during the period when the knob 360 is in the pause position while the driving turntable 42 continues to rotate. Accordingly, the tone arm assembly 48 may remain positioned on the uppermost record on the turntable 44 for any desired length of time and thereafter the knob 360 may be moved back to the drive position and the plate 326 pivoted back to the position shown in FIG. 7 so that the turntable 44 is started up and continues to play the remainder of the record. Due to the weight of the turntable 42 on the bearing sleeve 312 this sleeve remains in either position to which the knob 360 is adjusted since when the sleeve 312 is in the lower position shown in FIG. 11 the end of the sleeve 312 rests on the flange portion 370 of the sleeve 74 and when the sleeve 312 is in the upper position shown in FIG. 3 the ball bearing 320 rests on the undercut surface 372 of the sleeve 312.

While the above described snubbing blocks 352 have been illustrated to provide a stationary braking surface for the rim of the turntable 44 when this turntable is lowered in the manner described above, it will be understood that any other suitable arrangement may be employed to provide such braking action. For example, a flat collar may be secured to the upper end of the sleeve 74 immediately below the bottom surface of the hub portion 368 at the center of the upper turntable 44 so that when this turntable is lowered the surface 368 is brought into engagement with this stationary collar and is stopped. In this alternative arrangement, the rim of the upper turntable 44 may be eliminated and this upper turntable may be formed as a recessed plate in the upper surface of the driving turntable 42. Such an arrangement has the advantage of providing a visible indication that the driving turntable is continuing to rotate although the upper turntable plate has been stopped so that the machine will not be left for long periods of time with the driving turntable rotating. Other arrangements, may, of course, be employed to provide a braking action for the upper turntable in response to lowering of the drive turntable 42, as will be readily understood by those skilled in the art.

While the above described features of the present invention are particularly adapted to function with each other in the manner described in detail heretofore, it will be understood that certain features may be employed by themselves if desired. Thus, the turntable braking feature, either manually or automatically actuated, may be employed independently of the edge support assembly feature and spindle dropping feature. For example, the turntable braking feature may be employed separately in the automatic record changer disclosed in my above identified copending application. Also, the edge support assembly feature with tone arm indexing and last record sensing provided thereby may be employed separately from the feature of releasing the spindle so that it may be lowered for single record play.

While there have been illustrated and described several embodiments of the present invention, it will be understood that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. In an automatic record changer, a rotatable turntable, a record supporting spindle positioned at the center of said turntable for supporting records having a relatively small centering aperture, said spindle having means defining a single record supporting shelf on which a stack of small centering aperture records may be placed, a record ejector member pivotally mounted on said spindle and having an upper end portion adapted to engage the edge of the centering aperture of the bottommost record of the stack and push the bottommost record off said shelf so that it is deposited on said turntable during a record changing cycle, and means for mounting said spindle so that said spindle may be depressed to a retracted position in which said shelf thereof is below the upper surface of said turntable, the upper end of said spindle projecting above the upper surface of said turntable when in said retracted position to act as a centering means for manual play of a single small centering aperture record.

2. In an automatic record changer, a rotatable turntable, a centering spindle positioned at the center of said turntable, said spindle having a single record supporting shelf formed therein and including a pivoted blade cooperating with said shelf to release the bottom record of a stack of records supported on said shelf when said blade is actuated, said spindle being vertically bodily movable from a first position in which said shelf is positioned above the upper surface of said turntable to a second position in which said shelf is positioned below the upper surface of said turntable, and means operative only when said spindle is in said first position for actuating said pivoted blade, the upper end of said spindle when in said second position being positioned above the upper surface of said turntable to act as a centering means for the manual playing of a single record of the same type as said stack of records.

3. In an automatic record changer, a rotatable turntable, a centering spindle positioned at the center of said turntable, a curved record supporting member pivotally mounted about a horizontal axis, means including said spindle and said record supporting member for supporting a stack of records above said turntable and successively releasing the bottom record of the stack onto said turntable during successive record changing cycles, and means responsive to movement of said record supporting member to a predetermined position for permitting said spindle to be retracted to a position in which only the upper end of said spindle extends above the upper surface of said turntable.

4. In an automatic record changer, a rotatable turntable, a centering spindle positioned at the center of said turntable and including a record supporting shelf, a record supporting member pivotally mounted for movement from a fully retracted position to a position in which the tip of said member supports the edge of a stack of records positioned on said shelf, means including said spindle and said record supporting member for supporting a stack of records above said turntable and successively releasing the bottom record of the stack onto said turntable during successive record changing cycles, and means responsive to movement of said record supporting member to said fully retracted position for permitting said spindle to be retracted to a position in which only the upper end of said spindle extends above the upper surface of said turntable.

5. In an automatic record changer, a rotatable turntable, a centering spindle positioned at the center of said turntable and including a record supporting shelf, said spindle being movable vertically from a first position in which said shelf is positioned above the upper surface of said turntable to a second position in which said shelf is positioned below the upper surface of said turntable, means normally holding said spindle in said first position, a record supporting member pivotally mounted for movement from a fully retracted position to a position in which said member supports the edge of a stack of records positioned on said shelf when said spindle is in said first position, and means responsive to movement of said record supporting member to said fully retracted position for releasing said spindle so that the same may be moved to said second position.

6. In an automatic record changer, a rotatable turntable, a centering spindle positioned at the center of said turntable and including a shelf portion for at least partially supporting a stack of records above said turntable, a record supporting member movable to an active position and having a portion thereof arranged to support the edge of a stack of records positioned on said spindle when said supporting member is in said active position, said record supporting member being movable to an inactive position in which the record supporting portion of said member is positioned supstantially at or below the level of the upper surface of said turntable.

7. In an automatic record changer, a rotatable turntable, a centering spindle positioned at the center of said turntable and including a shelf portion for at least partially supporting a stack of records above said turntable, a record supporting member movable between upper and lower positions and having a portion thereof arranged to support the edge of a stack of records positioned on said spindle when said member is in said upper position, automatic record changing means for successively depositing the bottom record of a stack of records positioned on said spindle and said supporting member onto said turntable during successive record changing cycles, said record supporting member when in said lower position having said record supporting portion positioned at substantially the level of the upper surface of said turntable to facilitate the manual playing of a record on said turntable.

8. In an automatic record changer, a base member, a turntable rotatably mounted on said base member, a centering spindle positioned at the center of said turntable and including means for at least partially supporting a stack of records above said turntable, a record supporting member movable to a position in which the tip of said member supports the edge of a stack of records positioned on said spindle, means for successively releasing the bottom record of the stack onto said turntable during successive record changing cycles, and means for moving the tip of said record supporting member inwardly toward said spindle at the start of each record changing cycle to sense when the last record of the stack has been released onto said turntable.

9. In an automatic record changer, a base member, a turntable rotatably mounted on said base member, a centering spindle positioned at the center of said turntable and including means for at least partially supporting a stack of records above said turntable, a record supporting member movable to a position in which the tip of said member supports the edge of a stack of records positioned on said spindle, means for successively releasing the bottom record of the stack onto said turntable during successive record changing cycles, means for exerting a force on said record supporting member during each record changing cycle which force is sufficient to move the tip of said record supporting member inwardly toward said spindle by a substantial amount when no record is positioned in the path thereof, and means responsive to said substantial movement of said member for disabling the changer at the end of the playing cycle.

10. In an automatic record changer, a base member, a turntable rotatably mounted on said base member, means including an electric motor for driving said turntable, a centering spindle positioned at the center of said turntable and including means for at least partially supporting a stack of records above said turntable, a record supporting member movable to a position in which the tip of said member supports the edge of a stack of records positioned on said spindle, means for successively releasing the bottom record of the stack onto said turntable during successive record changing cycles, means for exerting a force on said record supporting member during each record changing cycle which force is sufficient to move the tip of said record supporting member inwardly toward said spindle by a substantial amount when no record is positioned in the path thereof, and means responsive to said substantial movement of said member for deenergizing said motor at the end of the playing cycle.

11. In an automatic record changer, a rotatable turntable, a centering spindle positioned at the center of said turntable and including means for at least partially supporting a stack of records above said turntable, a record supporting member movable to a support position in which the tip of said member supports the edge of a stack of records of predetermined diameter and standard centering aperture positioned on said spindle, the bottom record of said stack of records being supported on said centering spindle in offset relation to the center of said turntable, a slip-on spindle removably received on said centering spindle and arranged to support a stack of records of said predetermined diameter having enlarged centering apertures, the bottom record of said last-named stack of records being supported on said slip-on spindle in concentric relation to said turntable with the edge thereof adjacent the tip of said record supporting member, means for releasing the bottom record of said last-named stack onto said turntable during the record changing cycle, the tip of said record supporting member when in said support position being positioned outside the path of said last-named bottom record as it is released to said turntable, and means for moving the tip of said record supporting member inwardly toward said spindle at the start of each record changing cycle to determine when the last record of the stack has been released to said turntable.

12. In an automatic record changer, a rotatable turntable, a centering spindle positioned at the center of said turntable and including means for at least partially supporting a stack of records above said turntable, a record supporting member movable to a support position in which the tip of said member supports the edge of a stack of records of predetermined diameter and standard centering aperture positioned on said spindle, the bottom record of said stack of records being supported on said centering spindle in offset relation to the center of said turntable, a slip-on spindle removable received on said centering spindle and arranged to support a stack of records of said predetermined diameter having enlarged centering apertures, the bottom record of said last-named stack of records being supported on said slip-on spindle in concentric relation to said turntable with the edge thereof adjacent the tip of said record support member, means for releasing the bottom record of said last-named stack onto said turntable during the record changing cycle, the tip of said record supporting member when in said support position being positioned outside the path of said last named bottom record as it is released to said turntable, means for exerting a force on said record supporting member during each record changing cycle which force is sufficient to move the tip of said record supporting member inwardly toward said spindle by a substantial amount when no record is positioned in the path thereof, and means responsive to said substantial movement of said member for disabling the changer at the end of the playing cycle.

13. In an automatic record changer, a first rotatably mounted turntable having a downturned rim portion, means including an idler wheel adapted to engage the rim of said first turntable for rotating said first turntable, a second turntable rotatably mounted concentric with said first turntable and normally positioned on the upper surface of said first turntable so as to rotate therewith, said second turntable having an upper surface onto which a record is deposited during the record changing cycle, means defining a stationary surface beyond the edge of said first turntable, and means for lowering said first turntable by an amount sufficient to bring said second turntable into engagement with said stationary surface so that said second turntable is stopped.

14. In an automatic record changer, a first rotatably mounted turntable having a downturned rim portion, means including an idler wheel adapted to engage the rim of said first turntable for rotating said first turntable, a second turntable rotatably mounted concentric with said first turntable and normally positioned on the upper surface of said first turntable so as to rotate therewith, said second turntable having an upper surface onto which a record is deposited during the record changing cycle, means defining a stationary surface, and means for lowering said first turntable by an amount sufficient to bring said second turntable into engagement with said stationary surface and disconnect said first turntable from said second turntable, whereby said first turntable is stopped while said second turntable continues to rotate.

15. In an automatic record changer, a rotatably mounted driving member having a rim portion, means including an idler wheel adapted to engage the rim of said driving member for rotating the same, a turntable rotatably mounted concentric with said driving member and normally positioned on said driving member for rotation therewith, automatic record changing means for successively depositing records onto the upper surface of said turntable during successive record changing cycles, means defining a stationary surface, and means independent of said automatic record changing means for lowering said driving member by an amount sufficient to bring said turntable into engagement with said stationary surface and disconnect said driving member from said turntable.

16. In an automatic record changer, a rotatably mounted driving member having a rim portion, means including an idler wheel adapted to engage the rim of said driving member for rotating the same, a turntable rotatably mounted concentric with said driving member and normally positioned on said driving member for rotation therewith, automatic record changing means for successively depositing records onto the upper surface of said turntable during successive record changing cycles, means defining a stationary surface, and means controlled by said record changing means and operative during the record changing cycle for lowering said driving member by an amount sufficient to bring said turntable into engagement with said stationary surface and disconnect said driving member from said turntable in timed relation to the deposit of a record on said turntable so that said turntable is stationary when the record is deposited thereon.

17. In an automatic record changer, a rotatably mounted driving member having a rim portion, means including an idler wheel adapted to engage the rim of said driving member for rotating the same, a turntable rotatably mounted concentric with said driving member and normally positioned on said driving member for rotation therewith, automatic record changing means for successively depositing records onto the upper surface of said turntable during successive record changing cycles, means defining a stationary surface, means controlled by said record changing means and operative during the record changing cycle for lowering said driving member by an amount sufficient to bring said turntable into engagement with said stationary surface and disconnect said driving member from said turntable in timed relation to the deposit of a record on said turntable so that said turntable is stationary when the record is deposited thereon, and manual control means operable independently of said automatic record changing means for lowering said driving member by an amount sufficient to bring said turntable into engagement with said stationary surface and disconnect said driving member from said turntable, whereby said turntable may be stopped at any time during a playing cycle and independently of said automatic record changing means.

18. In an automatic record changer, a vertically extending hollow sleeve, a turntable rotatably mounted on said sleeve, a centering spindle slidably positioned within said sleeve and having a record actuating blade pivotally mounted therein, means defining a record support on said spindle for supporting a stack of records above said turntable, said blade cooperating with said record support on said spindle to release the bottommost record of the stack onto said turntable when said blade is actuated, means for actuating said blade during the record changing cycle, means normally holding said spindle in an upper position in which said blade is actuated during the record changing cycle, and means for releasing said holding means to permit movement of said spindle to a lower position in which only the upper end of said spindle extends above the upper surface of said turntable.

19. In an automatic record changer, a vertically extending hollow sleeve, a turntable rotatably mounted on said sleeve, a centering spindle slidably positioned within said sleeve and having a record actuating blade pivotally mounted therein, means defining a record support on said spindle for supporting a stack of records above said turntable, said blade cooperating with said record support on said spindle to release the bottommost record of the stack onto said turntable when said blade is actuated, said blade having an offset portion at the bottom end thereof, means adapted to engage said offset portion for actuating said blade during the record changing cycle, means normally holding said spindle in an upper position in which said blade is actuated by said last named means, and means for releasing said holding means to permit movement of said spindle to a lower position in which only the upper end of said spindle extends above the upper surface of said turntable.

20. In an automatic record changer, a vertically extending hollow sleeve, a turntable rotatably mounted on said sleeve, a centering spindle slidably positioned within said sleeve and having a record actuating blade pivotally mounted therein, means defining a record support on said spindle for supporting a stack of records above said turntable, said blade cooperating with said record support on said spindle to release the bottommost record of the stack onto said turntable when said blade is actuated, means for actuating said blade during the record changing cycle, a holding member normally positioned to engage said spindle and hold the same in an upper position in which said blade is actuated during the record changing cycle, and means for moving said holding member out of engagement with said spindle to permit the same to move downwardly within said sleeve to a lower position in which only the upper end of said spindle extends above the upper surface of said turntable.

21. In an automatic record changer, a vertically extending hollow sleeve, a turntable rotatably mounted on said sleeve, a centering spindle slidably positioned within said sleeve and having a record actuating blade pivotally mounted therein, means defining a record support on said spindle for at least partially supporting a stack of records above said turntable, a record supporting member movable between a fully retracted position and a position in which the tip of said record supporting member supports the edge of a stack of records positioned on said spindle, said blade cooperating with said record support on said spindle to release the bottommost record of the stack onto said turntable when said blade is actuated, means for actuating said blade during the record changing cycle, a holding member normally positioned to engage said spindle and hold the same in an upper position in which said blade is actuated during the record changing cycle, and means responsive to movement of said record supporting member to said fully retracted position for moving said holding member out of engagement with said spindle to permit the same to be moved downwardly within said sleeve to a lower position on which only the upper end of said spindle extends above the upper surface of said turntable.

22. In an automatic record changer, a vertically extending hollow sleeve, a turntable rotatably mounted on said sleeve, a centering spindle slidably positioned within said sleeve and having a record actuating blade pivotally mounted therein, means defining a record support on said spindle for supporting a stack of records above said turntable, said blade cooperating with said record support on said spindle to release the bottommost record of the stack onto said turntable when said blade is actuated, means for actuating said blade during the record changing cycle, means normally holding said spindle in an upper position in which said blade is actuated during the record changing cycle, means for releasing said holding means so that said spindle may be moved downwardly within said sleeve, and means including a lever pivotally connected to the bottom end of said blade for restraining said spindle in a lower position in which only the upper end of said spindle extends above the upper surface of said turntable.

23. In an automatic record changer, a vertically extending hollow sleeve, a turntable rotatably mounted on said sleeve, a centering spindle slidably positioned within said sleeve and having a record actuating blade pivotally mounted therein, means defining a record support on said spindle for supporting a stack of records above said turntable, said blade cooperating with said record support on said spindle to release the bottommost record of the stack onto said turntable when said blade is actuated, means for actuating said blade during the record changing cycle, means normally holding said spindle in an upper position in which said blade is actuated during the record changing cycle, means for releasing said holding means so that said spindle may be moved downwardly within said sleeve, means including a lever pivotally connected to the bottom end of said blade for restraining said spindle in a lower position in which only the upper end of said spindle extends above the upper surface of said turntable, and spring biased stop means positioned to be engaged by said lever when said blade is actuated during the record changing cycle, said stop means being normally positioned out of engagement with said lever so as to permit said spindle to fall to said lower position of its own weight when said holding means is released.

24. A record changer comprising: a motorboard; a first turntable positioned above the motorboard and mounted thereon for rotation; a second turntable positioned above said first turntable and mounted for rotation therewith; a spindle extending upwardly centrally of said turntables and supported by the motorboard for supporting a stack of records; means for ejecting the lowermost record in said stack from the spindle for movement to said second turntable; and means for stopping the rotation of said second turntable during the movement of an ejected record to said second turntable.

References Cited

UNITED STATES PATENTS

| | | | |
|---|---|---|---|
| 2,761,686 | 9/1956 | Stalling | 274—10 |
| 2,803,465 | 8/1957 | Dobrogowski et al. | 274—10 |
| 2,918,289 | 12/1959 | Hardy | 274—10 |
| 2,947,542 | 8/1960 | Grunwald | 274—10 |
| 2,980,429 | 4/1961 | Thevenaz | 274—39 |
| 3,017,188 | 1/1962 | Hansen | 274—15 |
| 3,044,784 | 7/1962 | Vitale | 274—39 |
| 3,096,093 | 7/1963 | Hardy | 274—15 X |
| 3,103,364 | 9/1963 | Macks et al. | 274—39 |
| 3,181,872 | 5/1965 | Dvorin | 274—15 |

NORTON ANSHER, *Primary Examiner.*

JOSEPH F. PETERS, Jr., *Assistant Examiner.*